G. G. Clark.
Calender Rolls.
N°. 19,623.   Patented Mar. 16, 1858.
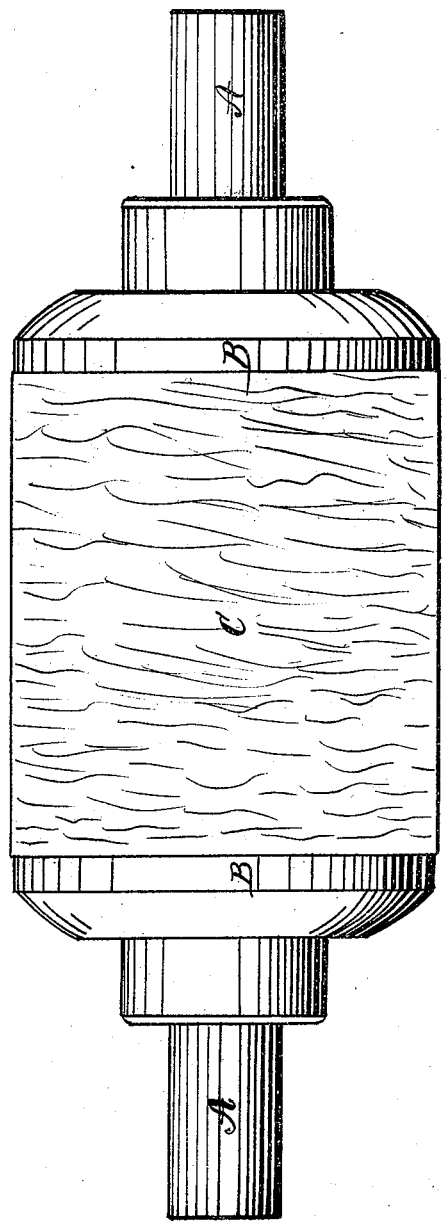

UNITED STATES PATENT OFFICE.

GARDNER G. CLARK, OF PROVIDENCE, RHODE ISLAND.

CALENDER-ROLL.

Specification of Letters Patent No. 19,623, dated March 16, 1858.

*To all whom it may concern:*

Be it known that I, GARDNER G. CLARK, of Providence, in the county of Providence, in the State of Rhode Island, have invented a new and Improved Calender-Roll for Squeezing and Finishing Cloth and Yarn; and I do hereby declare that the following is a full and exact description thereof, reference being had to the accompanying drawings and to the letters of reference marked thereon.

The nature of my invention consists in a cylinder roll with a hair surface.

Figure 1 is a cylinder composed of a metallic shaft A, A, and two heads B, B, between which heads is compressed animal hair C, which forms a smooth working surface.

What I claim as my invention and desire to secure by Letters Patent as a new article of manufacture, is—

A calender roll with its working surface formed of animal hair, in the manner and for the purpose specified.

GARDNER G. CLARK.

Witnesses:
STEPHEN CORNELL,
ARNOLD PETERS.